United States Patent
Weibel et al.

(10) Patent No.: US 10,552,763 B2
(45) Date of Patent: Feb. 4, 2020

(54) CONSTRAINT-AWARE RESOURCE SYNCHRONIZATION ACROSS HYPER-DISTRIBUTED LEARNING SYSTEMS

(71) Applicant: Cisco Technology, Inc., San Jose, CA (US)

(72) Inventors: Yannick Weibel, Lausanne (CH); Jean-Philippe Vasseur, Anchorage, AK (US); Grégory Mermoud, Veyras (CH)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/210,974

(22) Filed: Jul. 15, 2016

(65) Prior Publication Data

US 2017/0279849 A1   Sep. 28, 2017

Related U.S. Application Data

(60) Provisional application No. 62/313,072, filed on Mar. 24, 2016.

(51) Int. Cl.
*G06N 20/00*  (2019.01)
(52) U.S. Cl.
CPC .................... *G06N 20/00* (2019.01)
(58) Field of Classification Search
CPC .................................................. H04L 63/1458
(Continued)

(56) References Cited

U.S. PATENT DOCUMENTS 5,594,739 A * 1/1997 Lemieux ............... H04J 3/0641
                                                            370/350
6,636,781 B1  10/2003 Shen et al.
(Continued)

FOREIGN PATENT DOCUMENTS

WO   WO-2015139315 A1 * 9/2015  ............ H04J 3/0641

OTHER PUBLICATIONS

Stentz et al. "Market-based Approaches for Coordination of Multi-robot Teams at Different Granularities of Interaction" Carnegie Mellon University, Research Showcase @ CMU; 2004; pp. 1-8.
(Continued)

*Primary Examiner* — Peter C Shaw
(74) *Attorney, Agent, or Firm* — Behmke Innovation Group LLC; James Behmke; Stephen D. LeBarron

(57) ABSTRACT

In one embodiment, a device in a network receives data indicative of a target state for one or more distributed learning agents in the network. The device determines a difference between the target state and state information maintained by the device regarding the one or more distributed learning agents. The device calculates a synchronization penalty score for each of the one or more distributed learning agents. The device selects a particular one of the one or more distributed learning agents with which to synchronize, based on the synchronization penalty score for the selected distributed learning agent and on the determined difference between the target state and the state information regarding the selected distributed learning agent. The device initiates synchronization of the state information maintained by the device regarding the selected distributed learning agent with state information from the selected distributed learning agent.

15 Claims, 11 Drawing Sheets

(58) Field of Classification Search
USPC .......................................................... 726/7
See application file for complete search history.

(56) References Cited

U.S. PATENT DOCUMENTS

| | | | |
|---|---|---|---|
| 6,842,899 B2 | 1/2005 | Moody et al. | |
| 7,072,911 B1 | 7/2006 | Doman et al. | |
| 9,027,024 B2 | 5/2015 | Mick et al. | |
| 2006/0056340 A1* | 3/2006 | Hottinen | H04L 47/14 370/328 |
| 2007/0192863 A1* | 8/2007 | Kapoor | G06F 9/505 726/23 |
| 2009/0271447 A1* | 10/2009 | Shin | G06F 17/30194 |
| 2011/0214157 A1* | 9/2011 | Korsunsky | G06F 21/55 726/1 |
| 2013/0151658 A1* | 6/2013 | Baker | H04L 67/1095 709/217 |
| 2015/0142719 A1* | 5/2015 | Behuria | G06F 16/178 706/48 |
| 2015/0163760 A1* | 6/2015 | Wu | H04W 56/0015 370/336 |
| 2016/0100005 A1* | 4/2016 | Ho | G06Q 30/02 715/716 |
| 2017/0188177 A1* | 6/2017 | Kawsar | H04W 4/029 |

OTHER PUBLICATIONS

Wang et al. "XChange: A Market-based Approach to Scalable Dynamic Multi-resource Allocation in Multicore Architectures" Computer Systems Laboratory; Appears in Intl. Symp. on High Performance Computer Architecture, San Francisco, CA, Feb. 2015; pp. 1-13.

Rainer Palm "Synchronization of Decentralized Multiple-Model and Fuzzy Systems by Market-Based Optimization" 15th Triennial World Congress; Siemens AG, Corporate Technology, Information and Communications; 2002; pp. 1-6.

Pang et al. "Distributed Heterogeneous Database System Synchronization Problems in Intelligent Building" Proceedings of the 2012 2nd International Conference on Computer and Information Application (ICCIA 2012); pp. 1-4.

* cited by examiner

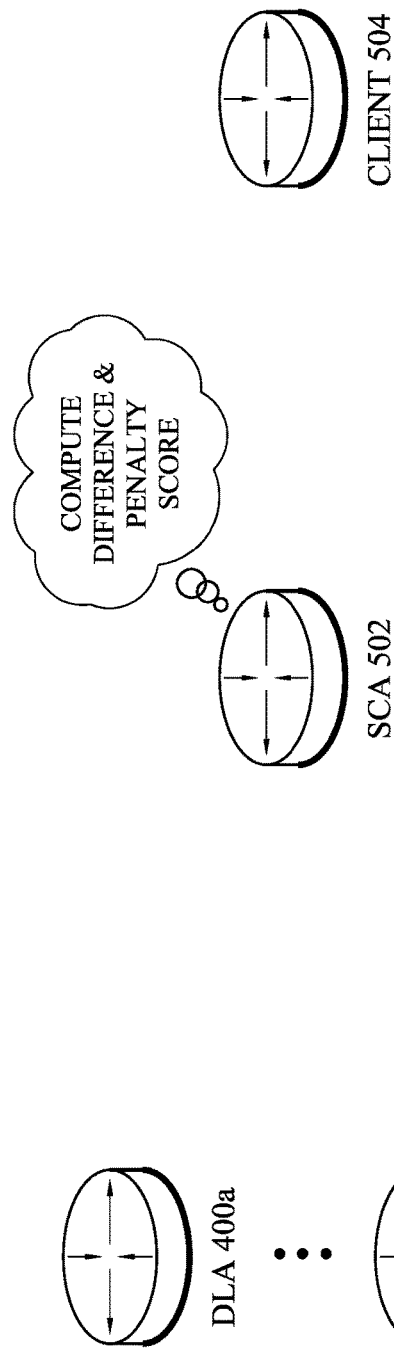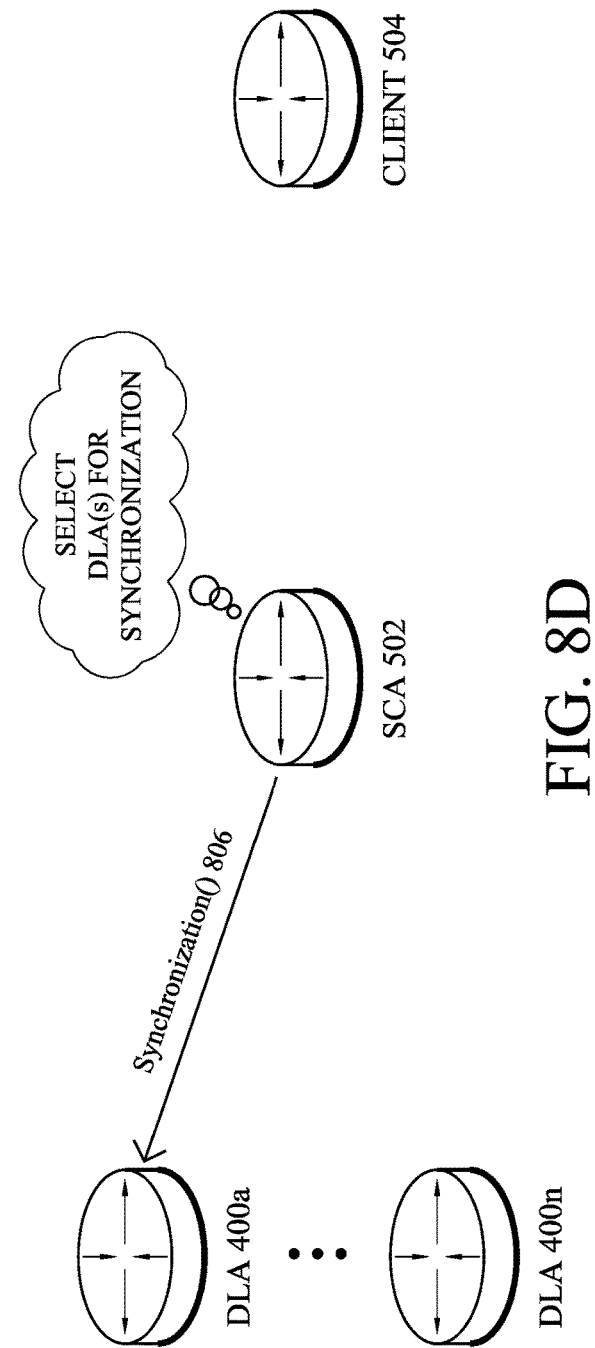

CONSTRAINT-AWARE RESOURCE SYNCHRONIZATION ACROSS HYPER-DISTRIBUTED LEARNING SYSTEMS

RELATED APPLICATION

This application claims priority to U.S. Provisional Application No. 62/313,072, filed Mar. 24, 2016, entitled CONSTRAINT-AWARE RESOURCE SYNCHRONIZATION ACROSS HYPER-DISTRIBUTED LEARNING SYSTEMS, by Weibel, et al., the contents of which are herein incorporated by reference.

TECHNICAL FIELD

The present disclosure relates generally to computer networks, and, more particularly, to constraint-aware resource synchronization across hyper-distributed learning systems.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

In hyper-distributed systems such as self-learning networks (SLN), the management and synchronization of data located at the edge with a centralized agent is a challenging task. The central system needs to manage balancing, failures, and retries, while ensuring a high quality of service for the different remotes agents. One of the great challenges with this is to deal with the heterogeneity of the data in terms of size (ranging from a few KB to several MB) and criticality (ranging from real-time constraints down to the millisecond to best effort, at some time in the day) while ensuring that various constraints are fulfilled, including those related to network resources (e.g., bandwidth, router CPU and memory).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8D illustrate an example of synchronization in an SLN.

DESCRIPTION OF EXAMPLE EMBODIMENTS

Overview

Figure 1A:
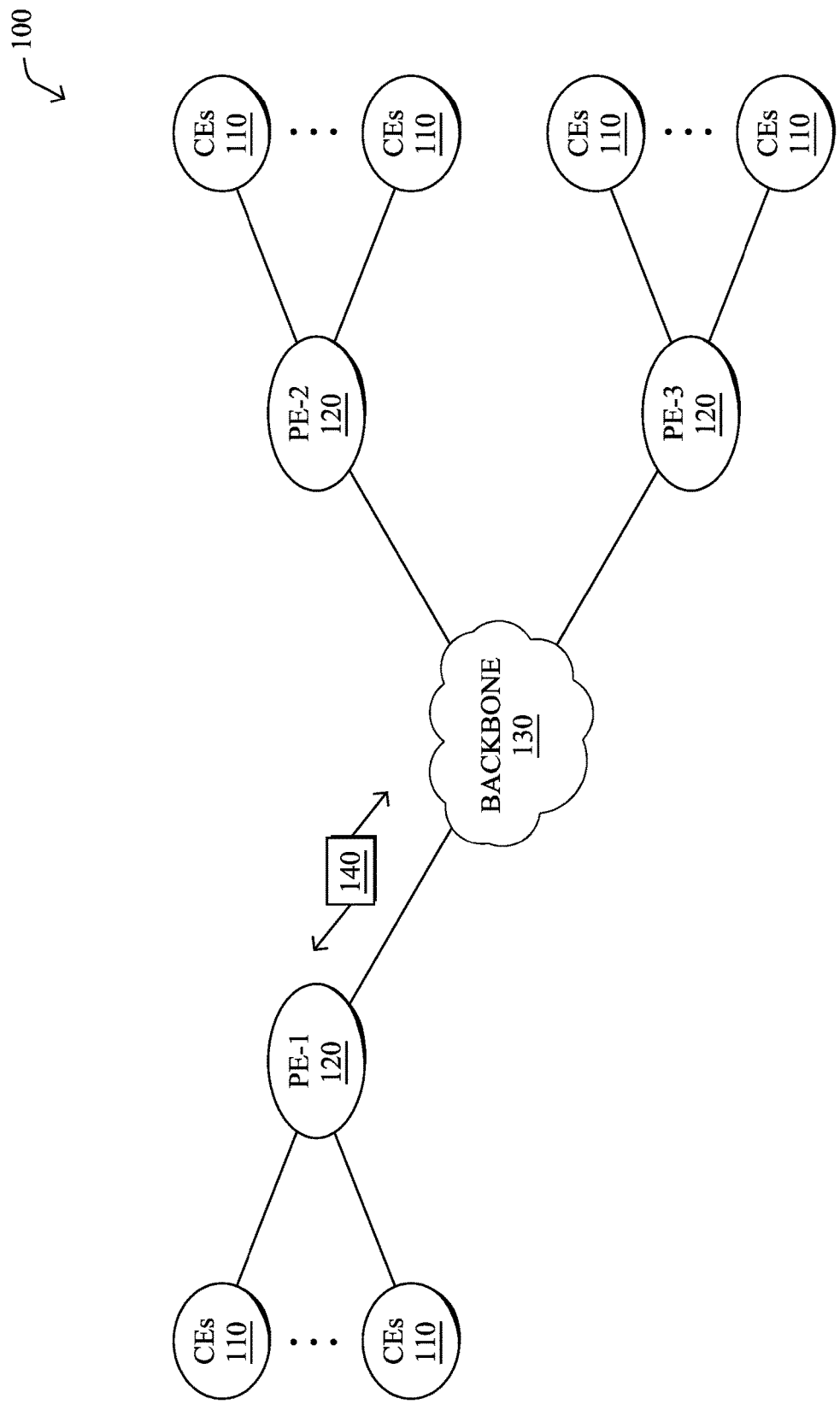
FIGS. 1A-1B illustrate an example communication network.

According to one or more embodiments of the disclosure, a device in a network receives data indicative of a target state for one or more distributed learning agents in the network. The device determines a difference between the target state and state information maintained by the device regarding the one or more distributed learning agents. The device calculates a synchronization penalty score for each of the one or more distributed learning agents. The device selects a particular one of the one or more distributed learning agents with which to synchronize, based on the synchronization penalty score for the selected distributed learning agent and on the determined difference between the target state and the state information regarding the selected distributed learning agent. The device initiates synchronization of the state information maintained by the device regarding the selected distributed learning agent with state information from the selected distributed learning agent.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
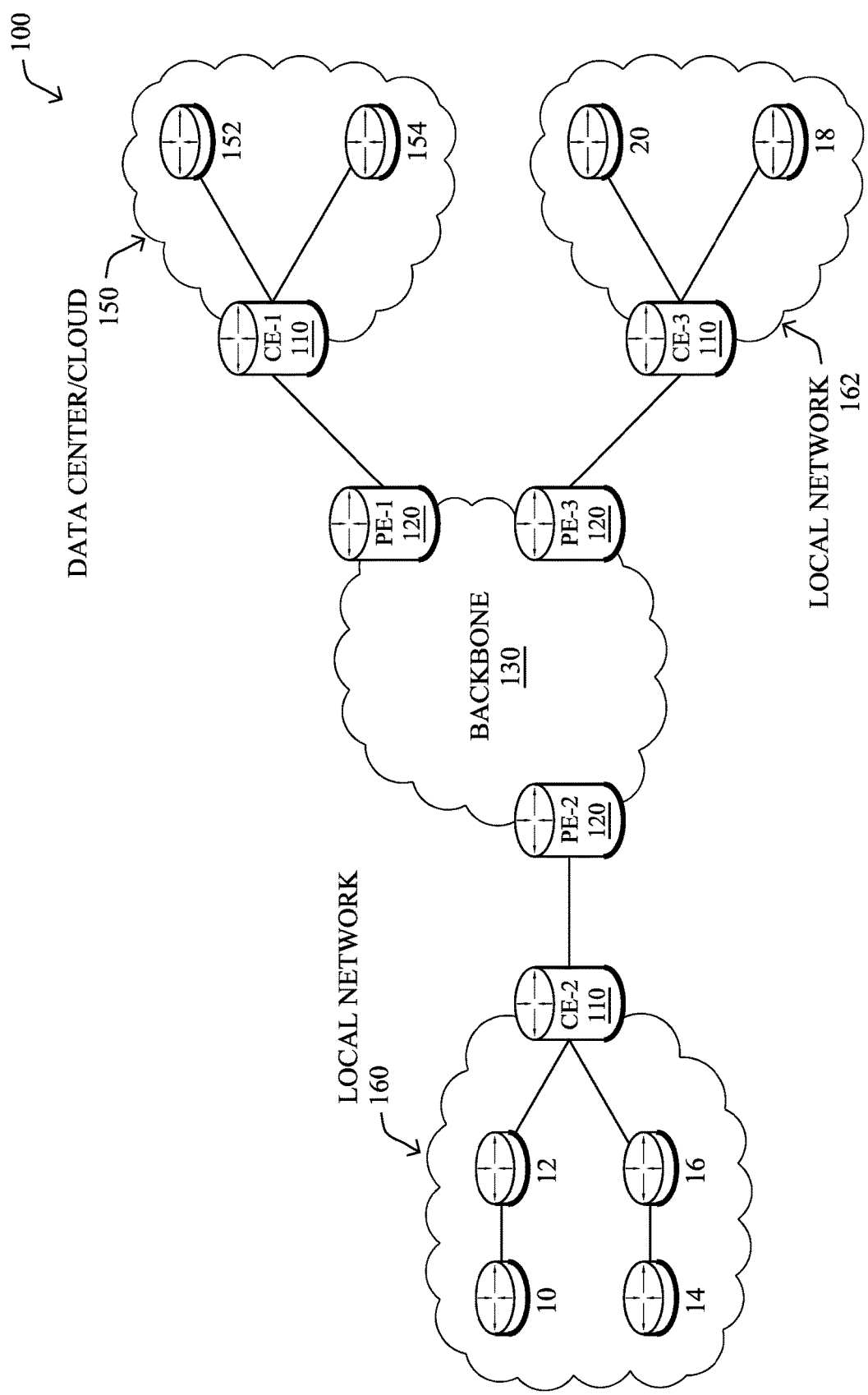

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
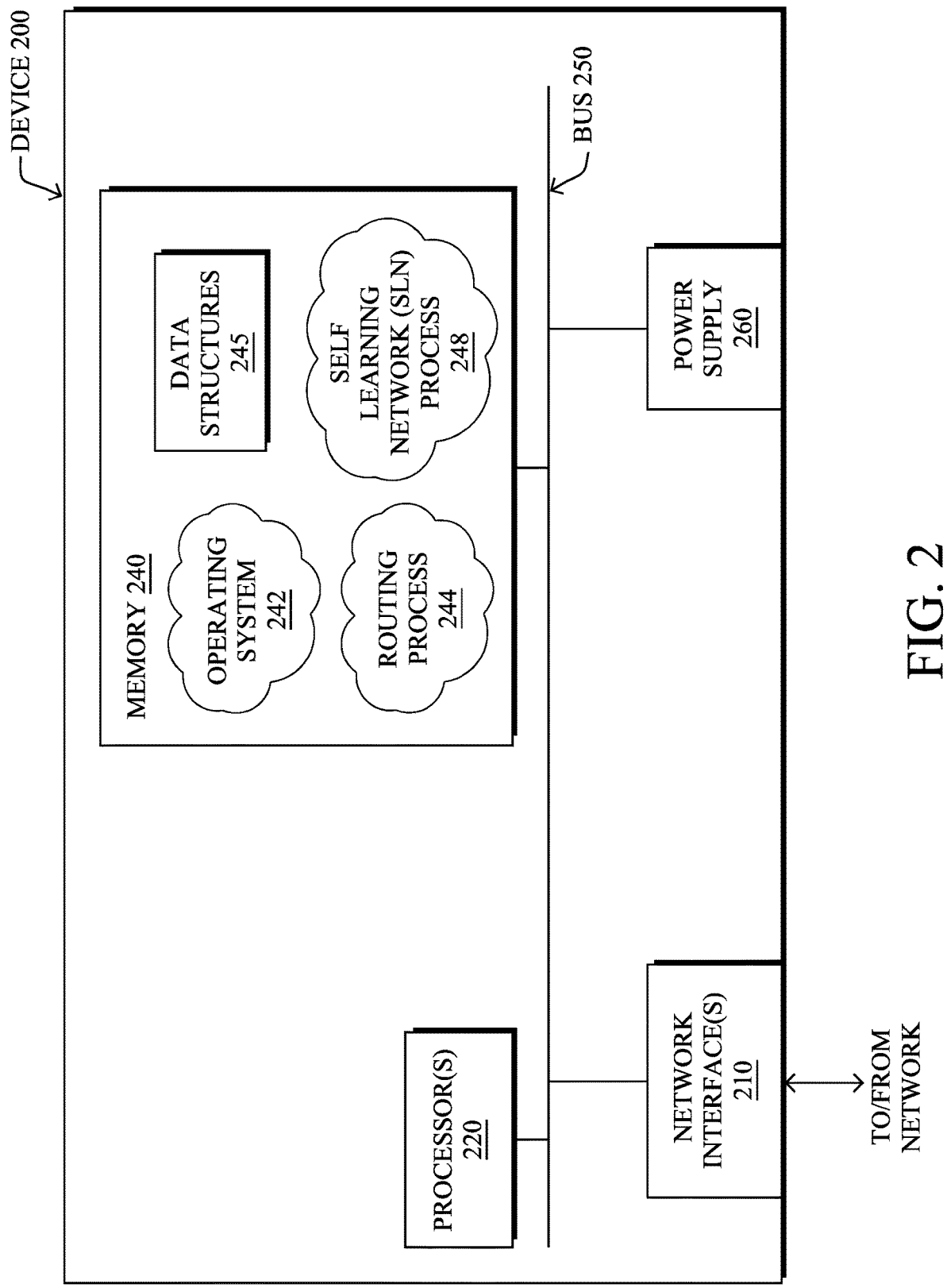
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.
SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
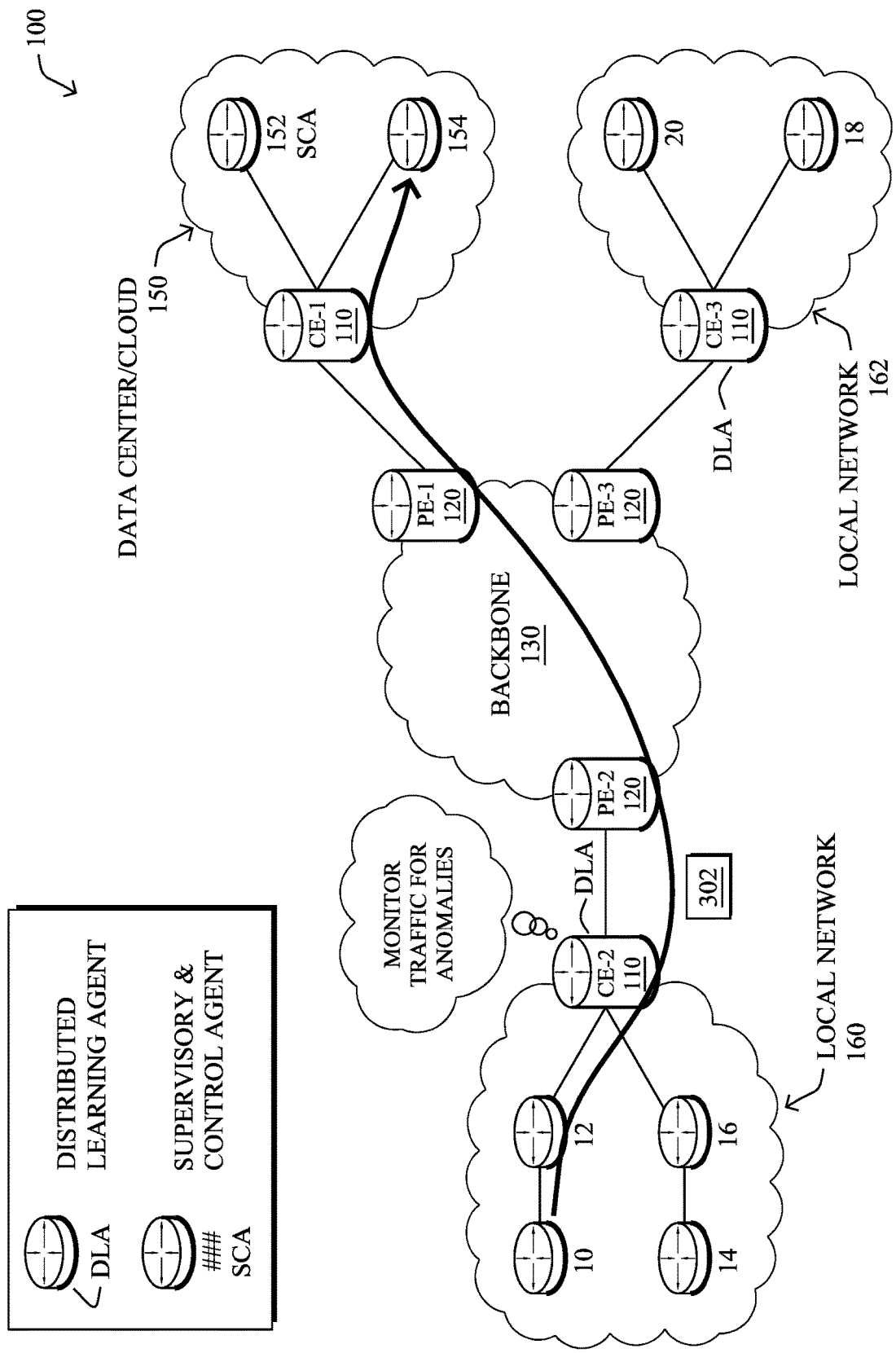
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
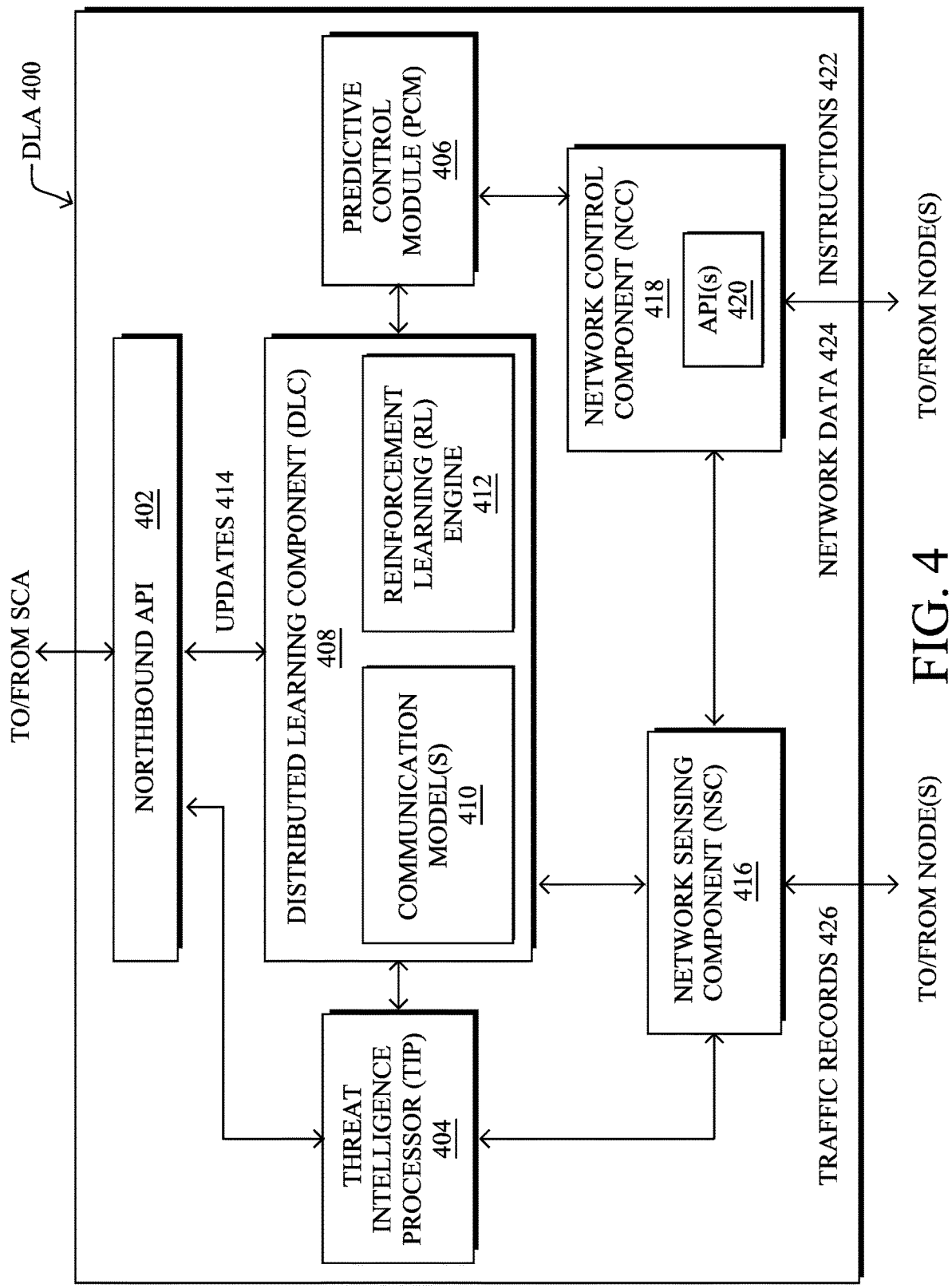
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, in hyper-distributed systems such as SLNs, the management and synchronization of data located at the edge (e.g., at a DLA) with a centralized agent (e.g., an SCA) is a challenging task. The central system needs to manage balancing, failures, and retries, while ensuring a high quality of service for the different remotes agents. One of the great challenges with this is to deal with the heterogeneity of the data in terms of size (ranging from a few KB to several MB) and criticality (ranging from real-time constraints down to the millisecond to best effort, at some time in the day), while ensuring that various constraints are fulfilled, including those related to network resources (e.g., bandwidth, router CPU and memory).

—Constraint-Aware Resource Synchronization—

The techniques herein allow a centralized agent to manage a very large number of remote devices (typically, several tens of thousands), while fulfilling constraints related to network resources, even if they are varying over time. Said differently, the techniques herein propose a hyper-distributed architecture to ensure the synchronization of heterogeneous data across a large number of remote agents under a wide range of constraints, possibly varying over time. In some aspects, the techniques herein may leverage a market-based approach that allows for a quick and systematic adaptation of the system to changing availability of network resources, which are dynamically updated thanks to an application programming interface (API) described herein.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, a device in a network receives data indicative of a target state for one or more distributed learning agents in the network. The device determines a difference between the target state and state information maintained by the device regarding the one or more distributed learning agents. The device calculates a synchronization penalty score for each of the one or more distributed learning agents. The device selects a particular one of the one or more distributed learning agents with which to synchronize, based on the synchronization penalty score for the selected distributed learning agent and on the determined difference between the target state and the state information regarding the selected distributed learning agent. The device initiates synchronization of the state information maintained by the device regarding the selected distributed learning agent with state information from the selected distributed learning agent.

Figure 5:
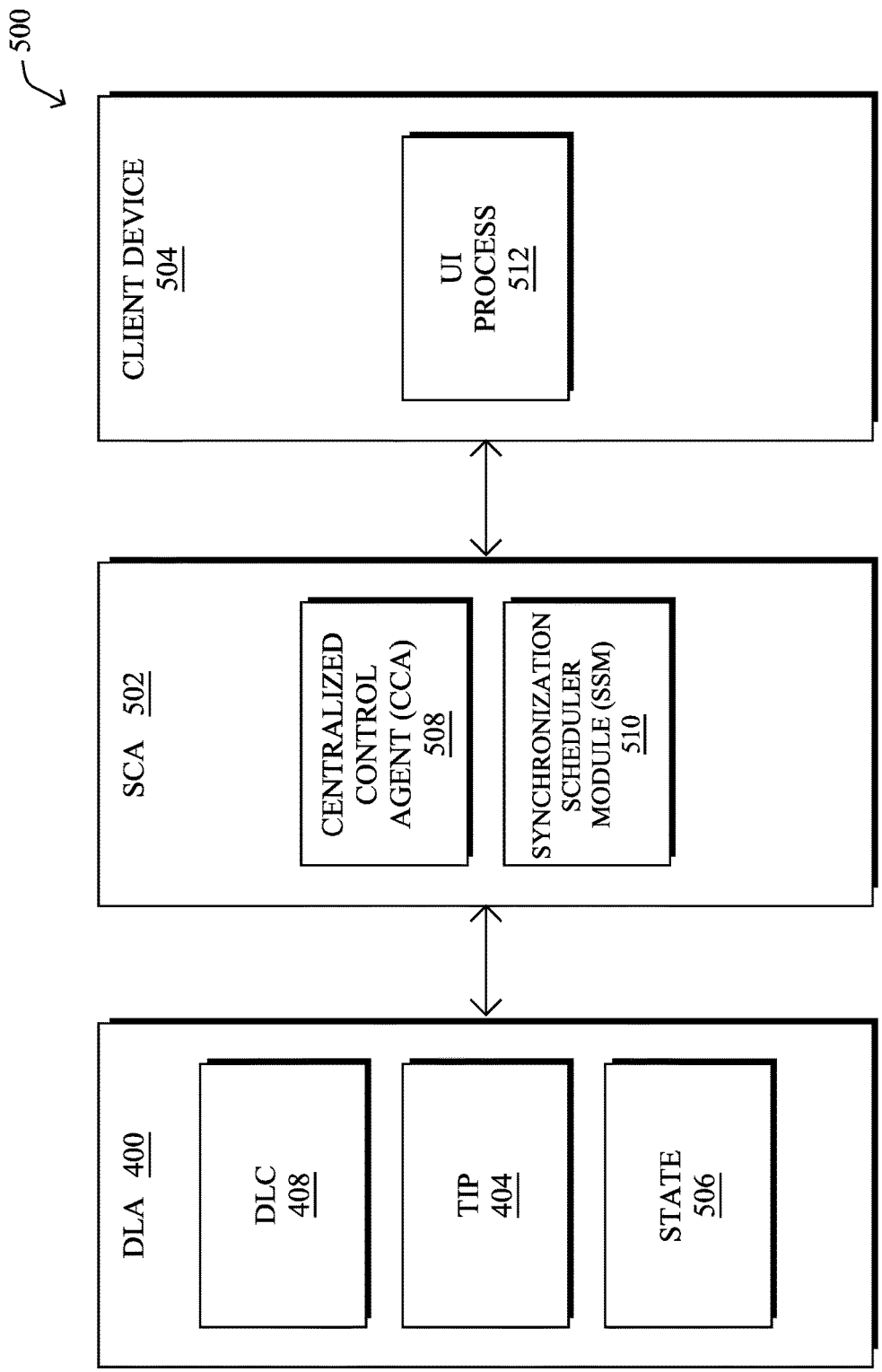
FIG. 5 illustrates an example architecture for synchronizing data in an SLN.

Operationally, FIG. 5 illustrates an example architecture for synchronizing data in an SLN, according to various embodiments. As shown, architecture 500 may include a DLA 400, an SCA 502, and potentially a client device 504 in communication therewith.

As described above, SCA 502 may provide supervisory control over DLA 400 and receives notifications of any anomalies detected by DLA 400. For example, SCA 502 may receive administrative commands and/or parameters from a user interface (UI) process 512 executed by client device 504 or directly on SCA 502. Notably, SCA 502 may generate visualizations for display by UI process 512, thereby allowing an administrator or other user to review the anomaly detection mechanisms in the network. In response, the user may provide feedback regarding any detected anomalies to DLA 400 via SCA 502.

Also as described above, DLA 400 may include a DLC 408 that uses machine learning to model and assess traffic data and a TIP 404 that determines the relevancy of any anomalies detected by DLC 408. Also as shown, DLA 400 may maintain state data 506. In general, state data may include any information regarding the configuration and/or operation of DLC 408. For example, state data 506 may include information regarding the anomaly detection models of DLA 400, the traffic record or other network data analyzed by the models, the anomaly detection results from the analysis, or the like.

A first aspect of the techniques herein is called a Centralized Control Agent (CCA) 508, which is a software module responsible for coordinating a set of proxies that are potentially delocalized and will perform most of the tasks associated to a set of remote agents (e.g., DLA 400, etc.). For example, SCA 502 or another supervisory device in the network may execute CCA 508.

Figure 6:
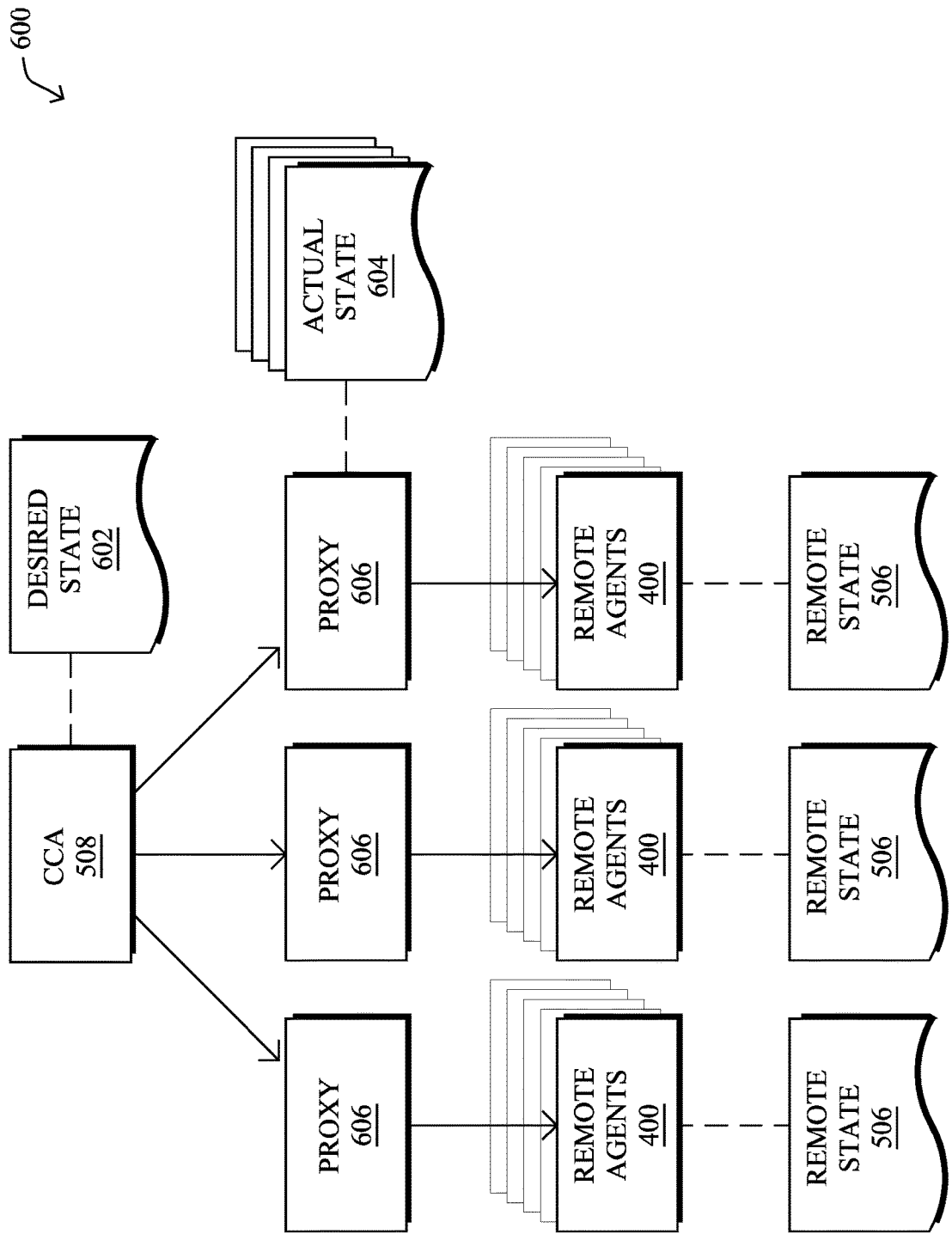
FIG. 6 illustrates an example diagram for passing state information to a centralized device.

FIG. 6 illustrates an example diagram for passing state information to a centralized device, in accordance with the embodiments herein. As shown, CCA 508 (e.g., executing on SCA 502) may maintain a set of states to be synchronized with remote agents/DLAs 400 via its proxies 606. Proxies 606 may, for example, be local to SCA 502 or, alternatively, distributed among other devices deployed in the network (e.g., intermediate devices between SCA 502 and the remote agents/DLAs 400, etc.

There may be three types of states maintained across the system:

1) The "desired"/target state 602, which is typically defined by a user via UI process 512 (e.g., a remote agent configuration), an external system (e.g., a mitigation action triggered by a third-party security system), or another component running in CCA 508 (e.g., centrally trained learning algorithms to be used at the edge).
2) The remote state 506, which is maintained by each remote agent/DLA 400. Whenever this state changes, the remote agent/DLA may send a NotifyStateUpdate( ) message to its corresponding proxy 606.
3) The actual state 604, which is the reflection in each proxy 606 of the remote state 506 of each agent/DLA 400. This state is updated upon receiving a NotifyStateUpdate( ) message from a given agent/DLA 400.

CCA 508 may monitor the difference between the desired/target state 602 and the actual state 604 maintained by proxies 606. Based on these differences, CCA 508 may trigger a series of messages (e.g., create, remove, modify), to ensure that the remote states 506 on remote agents/DLAs 400 and the actual states 604 maintained by proxies 606 remain in sync. These messages are added to a priority queue Q, as described in greater detail below with respect to FIG. 7.

Referring again to FIG. 5, another aspect of the techniques herein is a Synchronization Scheduler Module (SSM) 510, which is responsible for delaying (and possibly cancelling) synchronizations triggered by CCA 508 in response to CCA 508 detecting a difference between desired and actual states (e.g., states 602-604). To this end, SSM 510 may log every previous synchronization attempt and its completion status, as well as maintain data such the bandwidth $B_{i,j}$ used by each resource $R_j$ and each remote agent/

DLA 400, $A_i$. In its simplest embodiment, SSM 510 uses this information to compute a penalty $P_k$ to prioritize the synchronization $S_k$ with regard to others.

Figure 7:
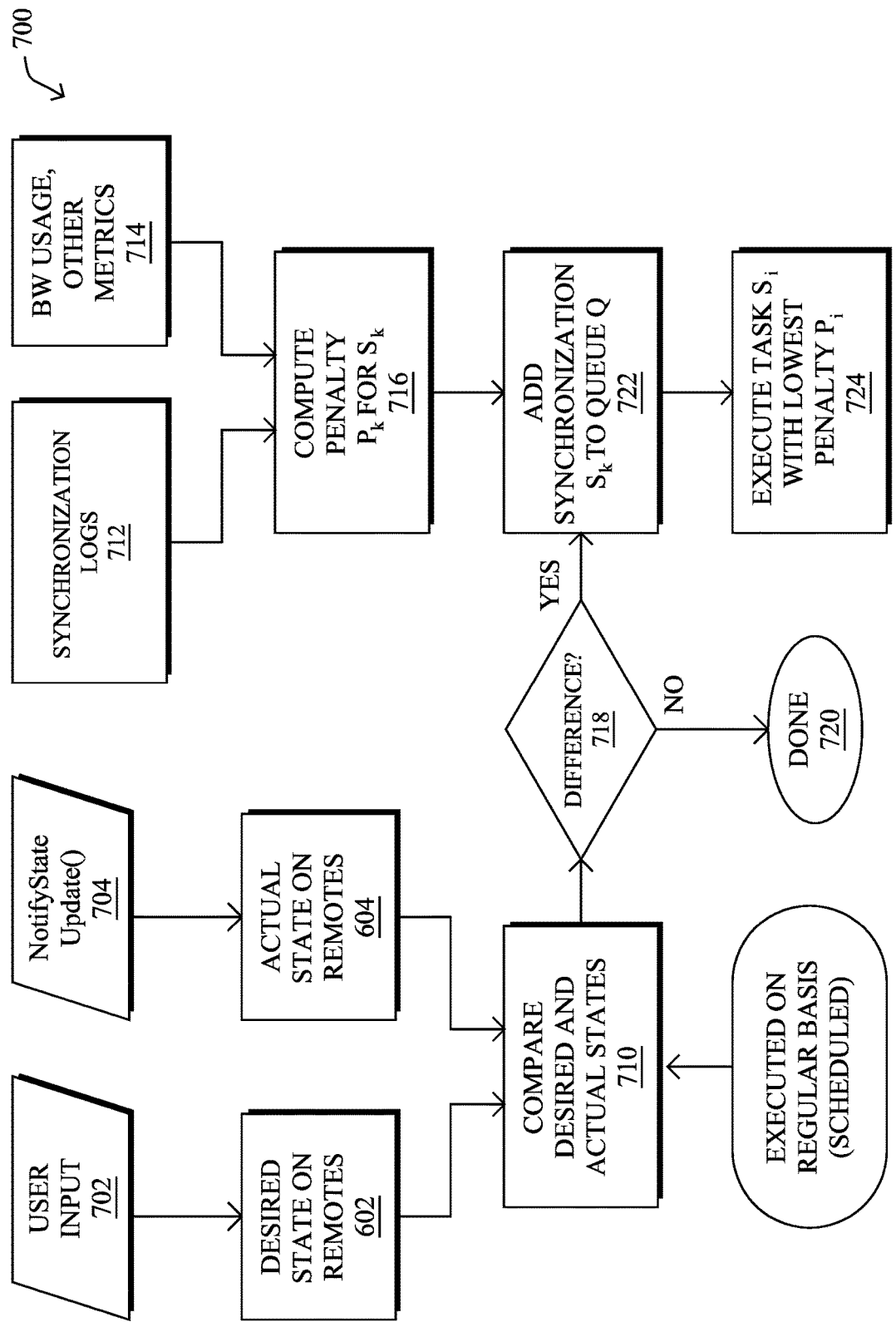
FIG. 7 illustrates an example flow diagram to synchronize state across devices.

FIG. 7 illustrates an example flow diagram 700 that illustrates the steps that CCA 508 and SSM 510 may take, to schedule a particular synchronization. In block 702, CCA 508 may receive user input 702 (e.g., from UI process 512). User input 702 may include, for example, data indicative of a desired state 602 for any or all of remote agents/DLAs 400 (e.g., a configuration, an action to be performed, etc.). In further embodiments, the device may receive data indicative of desired state 602 from another device/system or internal process of SCA 502.

In block 704, CCA 508, or a corresponding proxy 606 in communication therewith, may receive a NotifyStatusUpdate( ) message from a remote agent/DLA 400. Such a message may include, for example, data indicative of the remote state 506 of the remote device. In turn, the proxy 606 or CCA 508 updates the actual state 604 using the received state data.

In block 710, CCA 508 may compare the desired states 602 and actual states 604 for the remote agents/DLAs 400. As shown, CCA 508 may make this comparison on a regular basis, such as at scheduled times, on demand (e.g., in response to a request from UI process 512, another device, etc.), or at any other time.

If, in block 718, CCA 508 determines that no differences exist between desired and actual states 602-604, CCA 508 may terminate processing at block 720 until, e.g., the next round of comparisons. However, if CCA 508 determines that there is a difference between desired and actual states, 602-604 may notify SSM 510 that of the difference(s).

At block 716, SSM 510 may compute a penalty $P_k$ for the $k^{th}$ synchronization task $S_k$, based on synchronization logs 712 and/or bandwidth usage or other metrics 714, to prioritize the synchronization task $S_k$ with regard to others. Typically, the computation of $P_k$ by SSM 510 is based on simple rules such as the amount of bandwidth used by the corresponding remote agent/DLA 400 and the criticality of the state to be synchronized. For instance, a very critical resource such as a mitigation action used to stop the propagation of a malware will have a very small penalty, even on a remote agent/DLA 400 that has used up its budget of bandwidth. In other words, the penalty associated with any given synchronization task may be based in part on the priority of the synchronization, the resources required to perform the synchronization, and other factors such as the current or prior performance of synchronizations with the remote agent/DLA 400 (e.g., synchronization success rate, pending synchronizations, etc.).

At block 722, SSM 510 may add the synchronization task $S_k$ to its synchronization queue Q, to ensure synchronization of the corresponding desired and actual states 602-604. For example, assume that the desired state for a given remote agent/DLA is to drop traffic associated with a particular host (e.g., the host is associated with malware detected in the network), but the target agent/DLA does not currently have such a configuration. In such case, SSM 510 may add the synchronization task to its queue Q for processing.

At block 724, SSM 510 may execute a given synchronization task $S_i$ in queue Q, based on its associated penalty score $P_i$. For example, SSM 510 may execute the synchronization tasks in synchronization queue Q, giving highest priority to the task that has the lowest associated penalty score.

A further aspect of the techniques herein is a market-based mechanism that SSM 510 may employ to decide which synchronization task $S_k$ should be executed next. In this approach, each remote agent/DLA 400 is represented within SSM 510 as an entity participating in the "market." A broker sub-process is responsible for "selling" so-called "slots" that can be used for executing synchronization tasks. Depending on the amount of data to be synchronized, more than one slot must be acquired by the target agent/DLA 400. For example, the broker sub-process may allow for competition between the target agents/DLAs 400 for the next available slot in sequence, by having each agent entity submit a "bid" for the slot at the current cost or at a higher cost. The broker then adjusts the cost of the slot until a unique agent/DLA 400 is found. Once an agent has accumulated enough slots, the synchronization starts. Slots may also expire after some time, in some embodiments.

Each agent/DLA 400 may have a fixed amount of "revenue" to devote to the bidding process, which can be tuned as a function of the criticality of the particular agent or other criteria (e.g., remote agents in critical area of the network or those expected to require more resource may be given a larger revenue). Each agent/DLA 400 may implement its own buying strategy so as to optimize its performance metric, that is, to minimize the number and the duration of unsynchronized states, potentially weighted by criticality of the said state. Notably, if many critical synchronization tasks need to be performed across many remote agents/DLAs in parallel, the slot price will increase, for example, according to the available network resources (as described below) and other tasks will be delayed. Other factors can influence the slot price, though. For instance, the broker may offer fewer slots during office hours, to preserve critical user applications. On the contrary, the broker may put a large number of slots on the market, to allow for low-priority tasks to execute (e.g., software updates, maintenance tasks, etc.).

A further aspect of the techniques herein allows the broker(s) to convert available network resources into a cost function for the slots. To that end, a custom API is introduced that allows the broker sub-process to dynamically retrieve one or more metrics representative of the available network resources. The actual computation of such metrics may be performed by a network-availability-cost component that may be hosted on a central network controller, such as an NMS. Such a component is in charge of computing the cost metrics according to the set of available network resources. In one embodiment, the metrics may be common to all remote agents/DLAs 400 (e.g., for example, a set of Metrics $M_i$ ($M_1$=available bandwidth, $M_2$=predicted response time, etc.) used to represent the network resources). The metrics $M_1$ may be abstracted (e.g., a metric between 1 to 10 where 10 means "no constraint" and 1 means "no resource available") or, in another embodiment, $M_1$ may represent the "actual predicted available bandwidth" (e.g., a tunnel's reserved bandwidth, bandwidth SLA according to Intsery QoS models, etc.).

In yet another embodiment, such metrics may be computed on a per-remote agent/DLA basis (e.g., the available bandwidth for each remote agent).

In one embodiment, both SSM 510 and the brokers sub-processes are co-located in the same SCA 502. In other embodiments, however, both SSM 510 and the brokers may be distributed over multiple-platforms, which may or may not be co-located. In the distributed case, messages allowing for computation of $P_k$ may be local whereas bidding may take place across multiple platforms. Should these systems not share the same network, it may be required to normalize network availability resource metrics for the broker(s).

FIGS. 8A-8D illustrate an example of synchronization in an SLN, according to various embodiments. As shown, SCA 502 may provide supervisory control over any number of remote agents/DLAs 400a-400n (e.g., a first through nth DLA). In addition, SCA 502 may be in communication with client device 504 that provides a user interface to a human user.

In an example implementation, assume that SCA 502 maintains three types of tables:
- a "root" table that stores the desired state that the user wants for the system;
- a "cache" table that stores the current state of the system; and
- a "log" table that logs the completion status of each synchronization attempt.

An example workflow may then proceed as follows. First, SCA 502 may receive regular updates from the DLAs 400a-400n via NotifySetUpdate( ) messages 802a-802n, respectively, that reflect the current status of the sending DLA. In turn, SCA 502 may store this state information in its "cache" table that reflects the current state of the network.

Figure 8A:
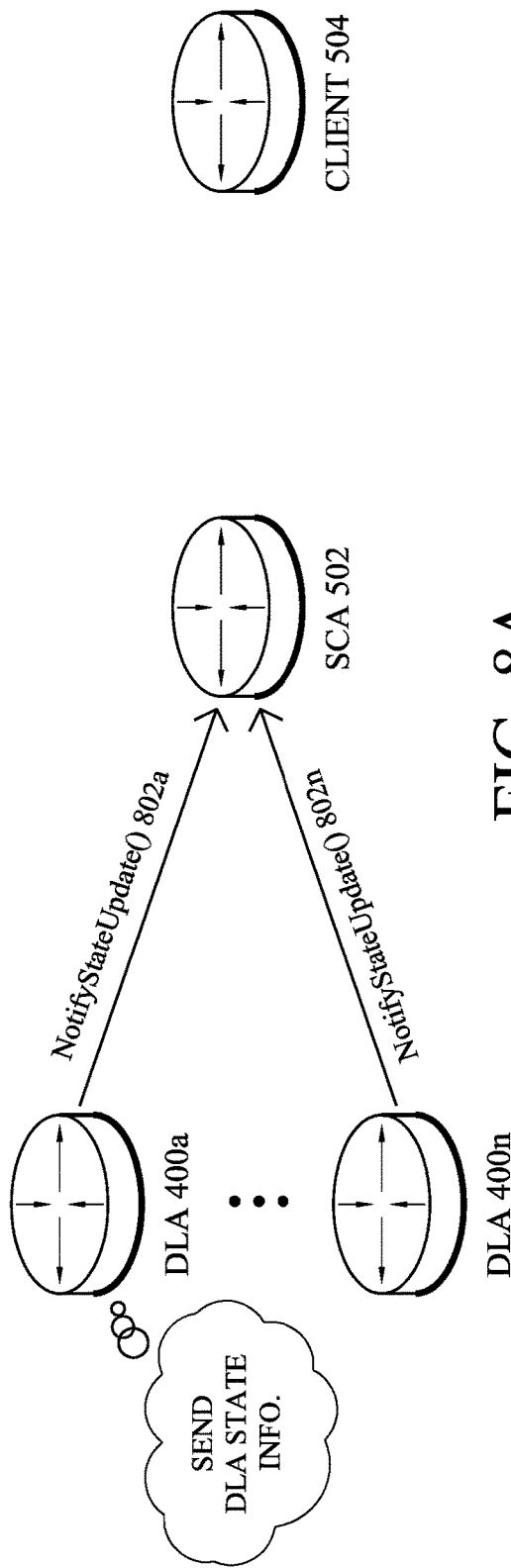
Figure 8B:
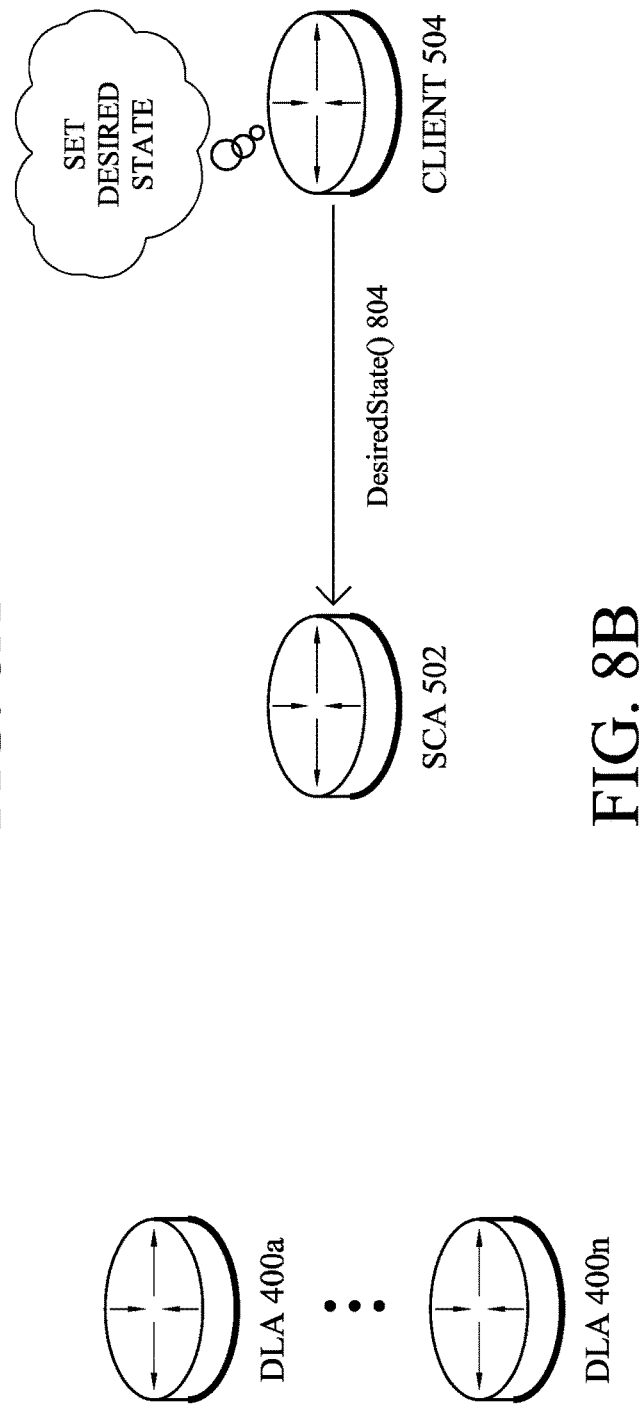

Next, as shown in FIG. 8B, SCA 502 may receive data indicative of a desired state for one or more of DLAs 400a-400n. For example, SCA 502 may receive a DesiredState( ) message 804 via the user interface of client device 504 that indicates the state that the user wishes to synchronize with the target DLA(s). SCA 502 may store this desired state information in its "root" table that reflects the desired state of the network.

As shown in FIG. 8C, SCA 502 may compute the differences between the "root" table and the "cache" table, to identify any differences between the desired and actual states of DLAs 400a-400n. In addition, SCA 502 may use its log table to compute a penalty score per DLA based on a set of rules. In other words, the history of synchronizations with a given DLA may affect the penalty score for that DLA. This penalty is used to determine whether synchronization is allowed at that time for that given DLA. It can also be used to define the priority of synchronization between the different DLAs 400a-400n. For example, SCA 502 may use the priority scores to do any or all of the following:
- Set a penalty of 2 if there are two or more active synchronization tasks with a particular DLA that started less than three minutes ago are have not yet completed;
- Set a penalty of 1 if one or more synchronizations have failed with the particular DLA within the past five minutes; and/or
- Set a penalty of 4 if the synchronization error ratio for the particular DLA in the past 30 minutes was more than 50% and ten or more synchronizations were attempted.

As would be appreciated, the above examples are for illustration only and any number of different rules can be applied to penalize certain DLAs, to prioritize the synchronization tasks across the DLAs.

As shown in FIG. 8D, based on the difference between the cache and root table and the per-DLA penalty, SCA 502 may select a particular DLA with which to synchronize in a prioritized manner. For example, SCA 502 may simply select the DLA with the lowest penalty score for synchronization. In further embodiments, SCA 502 may employ a market-based approach, to allow the DLAs to compete for synchronizations. Once a particular DLA is selected for synchronization, SCA 502 may initiate the synchronization task by sending a Synchronization( ) message to the selected DLA(s). For example, SCA 502 may send Synchronization( ) message 806a to DLA 400a that includes data indicative of the desired state for DLA 400a. DLA 400a may then use the received data to update its local state, accordingly.

Figure 9:
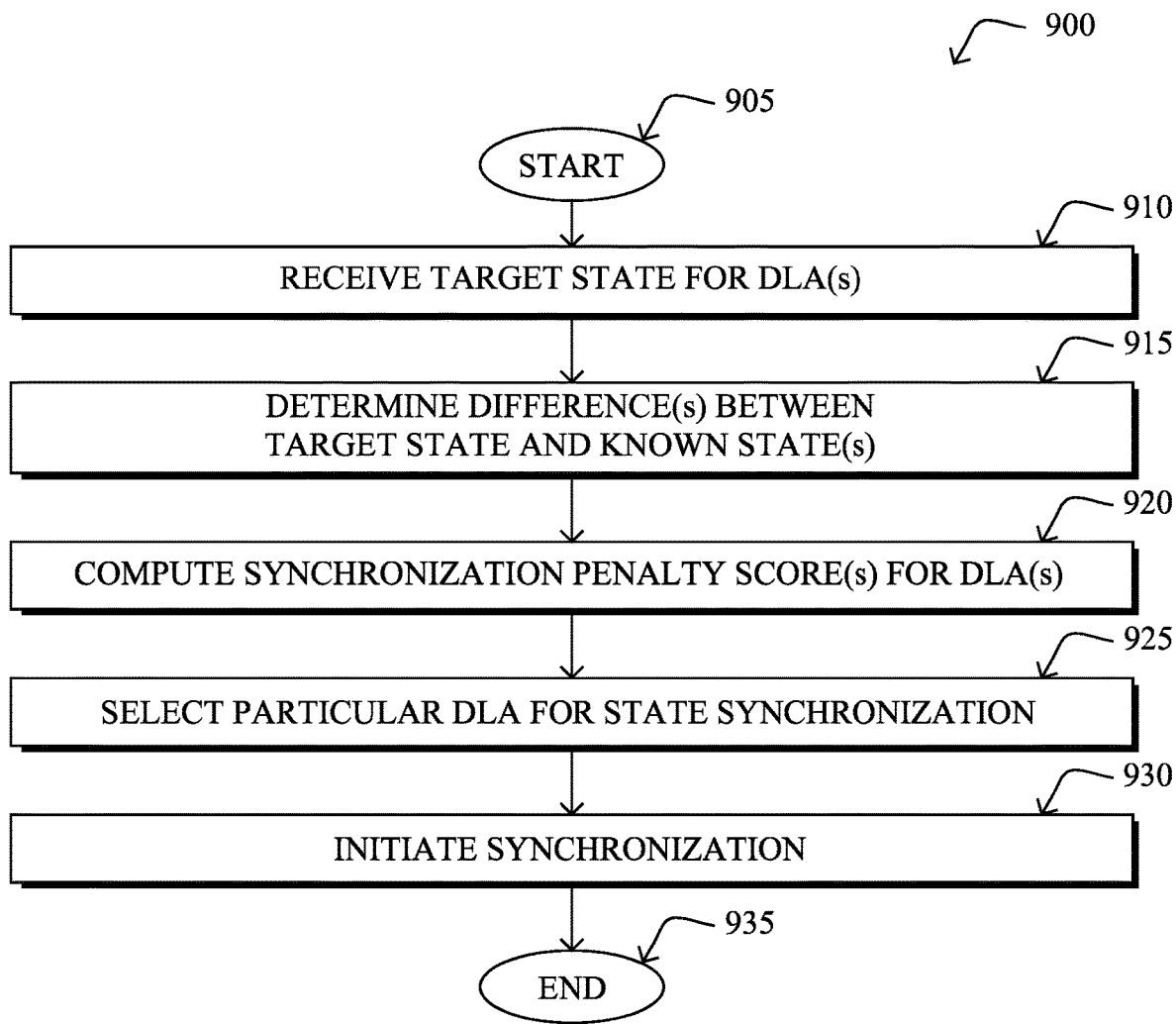
FIG. 9 illustrates an example simplified procedure for initiating synchronization of state in a network.

FIG. 9 illustrates an example simplified procedure for initiating synchronization of state in a network, in accordance with various embodiments herein. Generally, procedure 900 may be performed by a specialized networking device executing stored instructions. Procedure 900 may start at step 905 and continue on to step 910 where, as described in greater detail above, the device may receive data indicative of a target state for one or more DLAs in the network. For example, the device may receive an instruction to update a configuration of a particular DLA via a user interface. Such a configuration may include, but is not limited to, anomaly mitigation action(s) that the DLA should take (e.g., by dropping certain traffic, rerouting certain traffic, etc.), rules that the DLA should apply (e.g., reporting rules, whitelists/blacklists, etc.), model changes, or the like. In further cases, the device may receive the target state from another device in the network or from a local control module.

At step 915, as detailed above, the device may determine a difference between the target state and state information maintained by the device regarding the one or more distributed learning agents. For example, the device may maintain a database of the states of the DLAs, as reported to the device. In some embodiments, the DLAs may report their states directly to the device (e.g., whenever a state change occurs on the DLA) or, alternatively, via proxy agents for the DLAs.

At step 920, the device may calculate a penalty score for each of the one or more DLAs, as described in greater detail above. In various embodiments, the penalty score for a given DLA may be based in part on prior or current synchronizations associated with the DLA. For example, the penalty score may be based on one or more of: a number of unfinished synchronization jobs for the DLA, a number of failed synchronization jobs for the DLA, or a synchronization error rate for the DLA.

At step 925, as detailed above, the device may select a particular DLA for synchronization. In various embodiments, this selection may be based on the synchronization penalty score for the selected DLA and on the determined difference between the target state and the state information regarding the selected DLA. For example, the device may select the DLA for synchronization that has the lowest penalty score. In some embodiments, the selection may be based in part on a measure of criticality associated with the DLA and/or the target state. In further embodiments, the device may employ a market-based approach, to select the DLA with which to synchronize. In such an approach, the device may simulate an "auction" in which the DLAs compete for synchronization slots.

At step 930, the device may initiate synchronization with the selected DLA, to synchronize the state of the DLA with the target state. For example, the device may send data indicative of the target state to the DLA during a scheduled synchronization timeslot. Procedure 900 then ends at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for constraint-aware resource synchronization across hyper-distributed learning systems. In particular, the techniques herein enable the scalability of distributed systems, such as SLNs, especially in the presence of heterogeneity in the constraints and data to be synchronized. The techniques herein propose mechanisms to ensure reliable synchronization (through automated handling of failures) and efficient and flexible use of the available resource (through the market-based approach). By introducing an efficient mechanism for data synchronization across distributed remote agents, the techniques herein address a major problem with distributed learning systems such as SLN, where multiple sources of information must be coordinated and synchronized. Moreover, unlike traditional techniques, the embodiments herein are targeted to the top-down synchronization of many remote agents in a constraint-aware fashion, and automatically adapt their functioning to the intrinsic heterogeneity of the underlying network as well as the limited resources (e.g., bandwidth, router CPU/memory, etc.).

While there have been shown and described illustrative embodiments that provide for constraint-aware resource synchronization across hyper-distributed learning systems, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising: receiving, at a device in a network, data indicative of a target state for one or more distributed learning agents in the network, the distributed learning agents in the network comprising one or more machine learning-based anomaly detectors; determining, by the device, a difference between the target state and state information maintained by the device regarding the one or more distributed learning agents; calculating, by the device, a synchronization penalty score that is indicative of a synchronization history with the device for each of the one or more distributed learning agents; selecting, by the device, a particular one of the one or more distributed learning agents with which to synchronize, based on which distributed learning agent has a lowest calculated synchronization penalty score, and on the determined difference between the target state and the state information regarding the selected distributed learning agent, and a measure of criticality of the selected distributed learning agent; initiating, by the device, synchronization of the state information maintained by the device regarding the selected distributed learning agent with state information from the selected distributed learning agent; generating, by the device, a plurality of synchronization slots during which synchronization of the state information maintained by the device regarding the one or more distributed learning agents is to take place; and assigning, by the device, the synchronization to a particular synchronization slot.

2. The method as in claim 1, wherein the synchronization is assigned to the particular synchronization slot based in part on the measure of criticality of the selected distributed learning agent.

3. The method as in claim 2, wherein the synchronization is assigned to the particular synchronization slot based in part on a network resource cost function associated with the particular synchronization slot.

4. The method as in claim 1, further comprising: varying, by the device, a number of available synchronization slots over a period of time based on one or more conditions of the network.

5. The method as in claim 1, wherein the synchronization penalty score for the selected distributed learning agent is based on at least one of: a number of unfinished synchronization jobs for the distributed learning agent, a number of failed synchronization jobs for the distributed learning agent, or a synchronization error rate for the distributed learning agent.

6. The method as in claim 1, further comprising: receiving, at the device, the data indicative of the target state for the one or more distributed learning agents in the network from a user interface.

7. The method as in claim 1, wherein the target state for the one or more distributed learning agents corresponds to a configuration for the one or more distributed learning agents.

8. An apparatus, comprising: one or more network interfaces to communicate with a network; a processor coupled to the network interfaces and configured to execute one or more processes; and a memory configured to store a process executable by the processor, the process when executed operable to: receive data indicative of a target state for one or more distributed learning agents in the network, the distributed learning agents in the network comprising one or more machine learning-based anomaly detectors; determine a difference between the target state and state information maintained by the apparatus regarding the one or more distributed learning agents; calculate a synchronization penalty score that is indicative of a synchronization history with the apparatus for each of the one or more distributed learning agents; select a particular one of the one or more distributed learning agents with which to synchronize, based on which distributed learning agent has a lowest calculated synchronization penalty score, and on the determined difference between the target state and the state information regarding the selected distributed learning agent, and a measure of criticality of the selected distributed learning agent; initiate synchronization of the state information maintained by the apparatus regarding the selected distributed learning agent with state information from the selected distributed learning agent; generate a plurality of synchronization slots during which synchronization of the state information maintained by the apparatus regarding the one or more distributed learning agents is to take place; and assign the synchronization to a particular synchronization slot.

9. The apparatus as in claim 8, wherein the synchronization is assigned to the particular synchronization slot based in part on theft measure of criticality of the selected distributed learning agent.

10. The apparatus as in claim 9, wherein the synchronization is assigned to the particular synchronization slot based in part on a network resource cost function associated with the particular synchronization slot.

11. The apparatus as in claim 8, wherein the process when executed is further operable to: vary a number of available synchronization slots over a period of time based on one or more conditions of the network.

12. The apparatus as in claim 8, wherein the synchronization penalty score for the selected distributed learning agent is based on at least one of: a number of unfinished synchronization jobs for the distributed learning agent, a number of failed synchronization jobs for the distributed learning agent, or a synchronization error rate for the distributed learning agent.

13. The apparatus as in claim 8, wherein the process when executed is further operable to: receive the data indicative of the target state for the one or more distributed learning agents in the network from a user interface.

14. The apparatus as in claim 8, wherein the target state for the one or more distributed learning agents corresponds to a configuration for the one or more distributed learning agents.

15. A tangible, non-transitory, computer-readable medium storing program instructions that cause a device in a network to execute a process comprising: receiving data indicative of a target state for one or more distributed learning agents in the network, the distributed learning agents in the network comprising one or more machine learning-based anomaly detectors; determining a difference between the target state and state information maintained by the device regarding the one or more distributed learning agents; calculating a synchronization penalty score that is indicative of a synchronization history with the device for each of the one or more distributed learning agents; selecting a particular one of the one or more distributed learning agents with which to synchronize, based on which distributed learning agent has a lowest calculated synchronization penalty score and on the determined difference between the target state and the state information regarding the selected distributed learning agent, and a measure of criticality of the selected distributed learning agent; initiating synchronization of the state information maintained by the device regarding the selected distributed learning agent with state information from the selected distributed learning agent; generating, by the device, a plurality of synchronization slots during which synchronization of the state information maintained by the device regarding the one or more distributed learning agents is to take place; and assigning, by the device, the synchronization to a particular synchronization slot.

* * * * *

UNITED STATES PATENT AND TRADEMARK OFFICE
CERTIFICATE OF CORRECTION

PATENT NO. : 10,552,763 B2
APPLICATION NO. : 15/210974
DATED : February 4, 2020
INVENTOR(S) : Yannick Weibel et al.

It is certified that error appears in the above-identified patent and that said Letters Patent is hereby corrected as shown below:

In the Specification

Column 6, Line 54, should read:
VPN" <draft-ietf-l2vpn-evpn>, introduce a solution for Column 19, Line 42, should read:
thereof. Accordingly this description is to be taken only by In the Claims Column 21, Line 3, should read:
in part on the measure of criticality of the selected distrib- Signed and Sealed this
Ninth Day of June, 2020

Andrei Iancu
*Director of the United States Patent and Trademark Office*